United States Patent [19]

Kump

[11] Patent Number: 5,490,651
[45] Date of Patent: Feb. 13, 1996

[54] HINGED CEILING CLIP

[75] Inventor: Daniel J. Kump, Mentor, Ohio

[73] Assignee: Fasteners For Retail, Inc., Cleveland, Ohio

[21] Appl. No.: 109,818

[22] Filed: Aug. 20, 1993

[51] Int. Cl.⁶ .................................................. A47B 97/00
[52] U.S. Cl. .......................... 248/222.12; 24/457; 24/489; 24/543; 248/231.81; 248/320; 248/340
[58] Field of Search ..................... 248/231.8, 317, 248/320, 321, 322, 221.4, 228, 340, 343; 24/543, 547, 489, 457, 499, 545, 487

[56] References Cited

U.S. PATENT DOCUMENTS

| | | |
|---|---|---|
| 3,018,080 | 1/1962 | Loudon . |
| 3,327,376 | 6/1967 | Freeman et al. . |
| 3,384,935 | 5/1968 | Salvador . |
| 3,616,497 | 11/1971 | Esposito, Jr. . |
| 3,743,228 | 7/1973 | Drab . |
| 3,936,913 | 2/1976 | Weissman . |
| 3,952,985 | 4/1976 | Davenport . |
| 4,025,019 | 5/1977 | Jacobsen et al. . |
| 4,065,090 | 12/1977 | Mauney . |
| 4,071,930 | 2/1978 | Tanaka ........................ 24/543 |
| 4,073,458 | 2/1978 | Sease . |
| 4,074,885 | 2/1978 | Hacker, Jr. . |
| 4,112,550 | 9/1978 | DeWitt et al. . |
| 4,118,000 | 10/1978 | Campbell ...................... 248/228 |
| 4,135,692 | 1/1979 | Ferguson . |
| 4,163,576 | 8/1979 | Hoop . |
| 4,191,352 | 3/1980 | Schuplin . |
| 4,240,604 | 12/1980 | Brach . |
| 4,291,855 | 9/1981 | Schenkel . |
| 4,315,611 | 2/1982 | Hoop .................................. 248/317 X |
| 4,323,215 | 4/1982 | Berger . |
| 4,514,885 | 5/1985 | Delahousse et al. . |
| 4,564,165 | 1/1986 | Grant et al. ........................ 248/317 X |
| 4,624,432 | 11/1986 | Salacore . |
| 4,667,913 | 5/1987 | Peelle et al. . |
| 4,762,296 | 8/1988 | Kraus et al. . |
| 4,763,390 | 8/1988 | Rooz . |

OTHER PUBLICATIONS

SuperKlips & Hooks Advertising Brochure, Super Glue Corporation© 1984.
FFR 1993 Buyers Guide & Pricelist, p. 25.

Primary Examiner—Alvin C. Chin-shue
Assistant Examiner—Derek J. Berger
Attorney, Agent, or Firm—Fay, Sharpe, Beall, Fagan, Minnich & McKee

[57] ABSTRACT

A hanger clip construction adapted for use with overhead members, such as the T-bars of suspended ceilings, includes a first arm having first and second ends and a second arm having first and second ends. A first hinge connects the first arm second end to the second arm first end. A spring member is secured at a first end by a second hinge to the first arm and at a second end by a third hinge to the second arm. The spring maintains the first and second arms in one of two stable end positions of the hanger clip. The spring is in tension only when the first and second arms are between the two stable end positions. In one of the stable end positions, the first arm first end and the second arm second end extend over side edges of the overhead member to secure the hanger clip thereto.

20 Claims, 4 Drawing Sheets

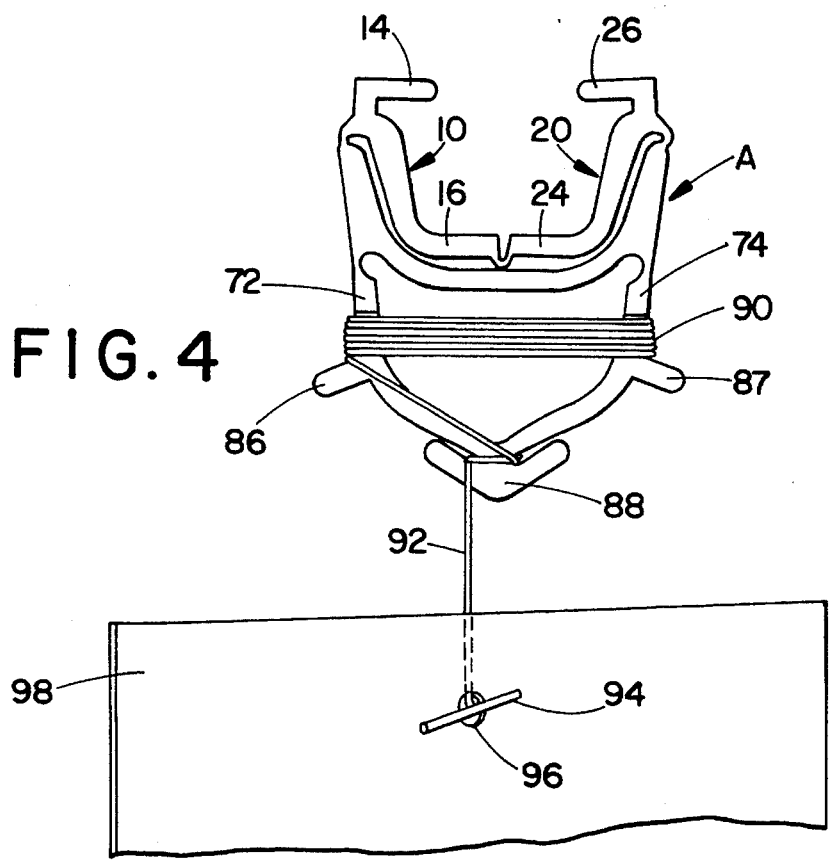
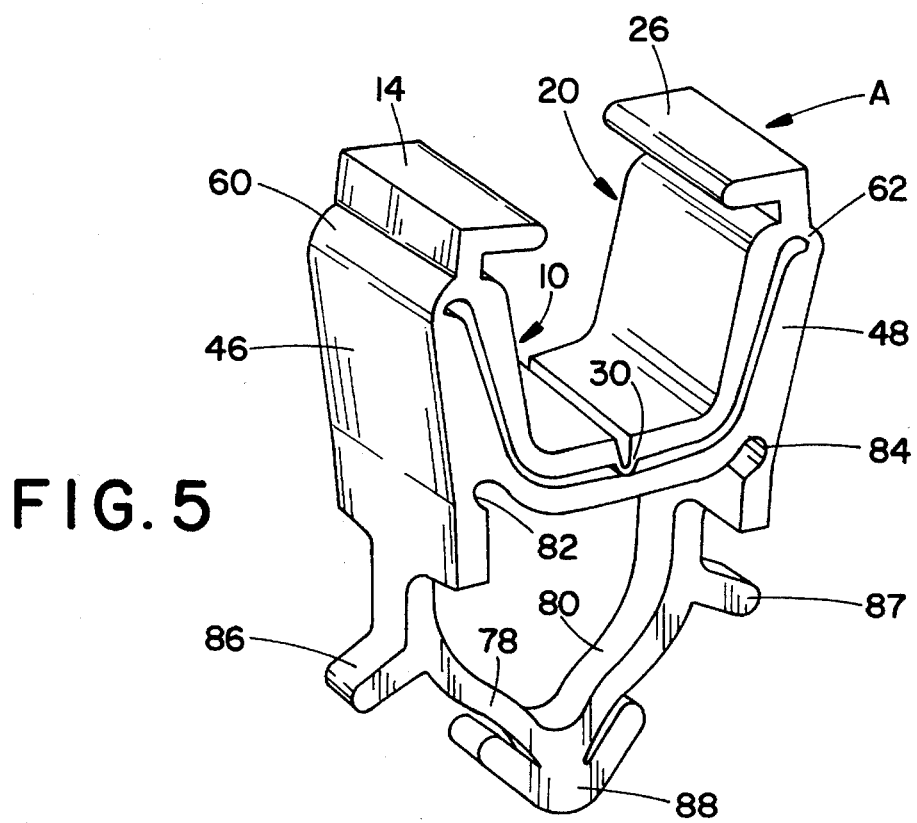

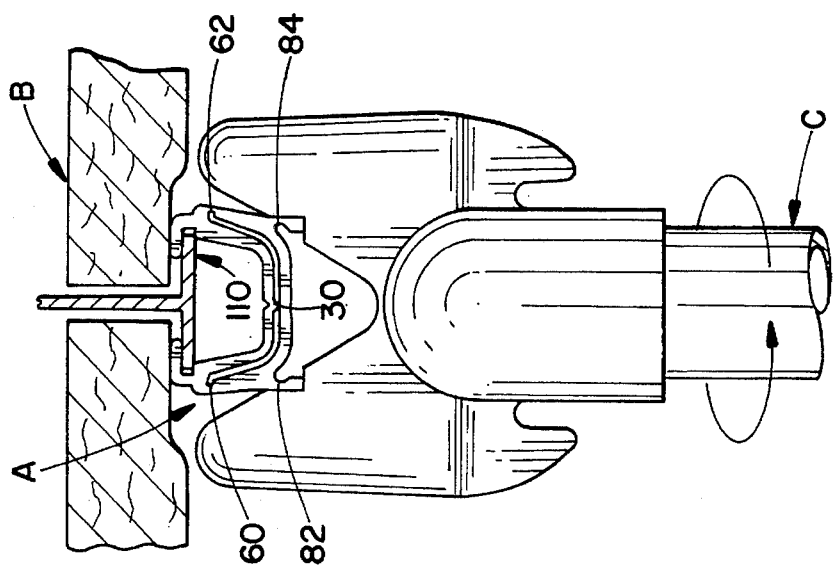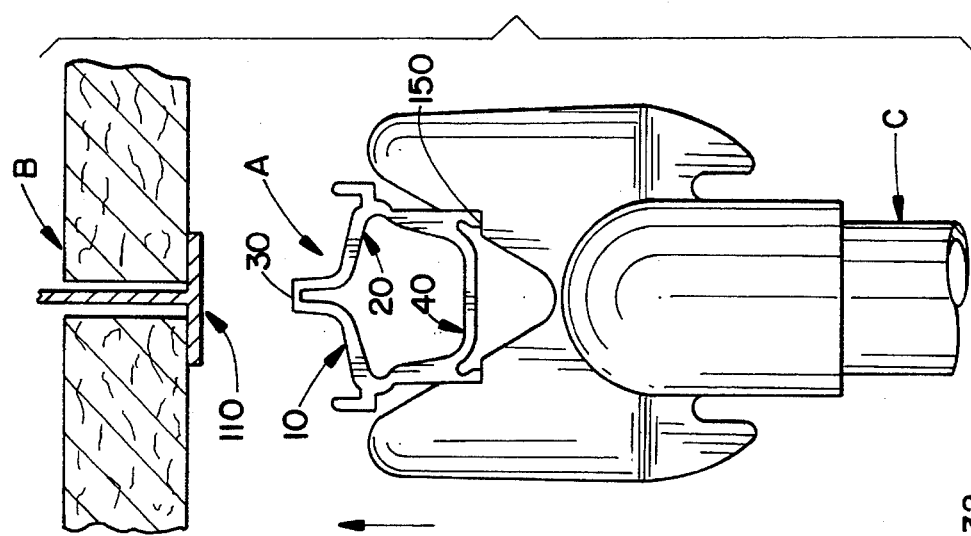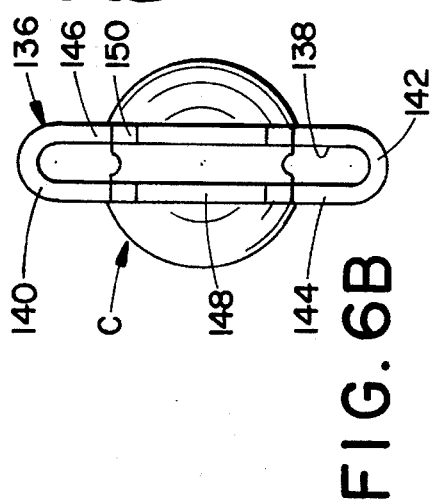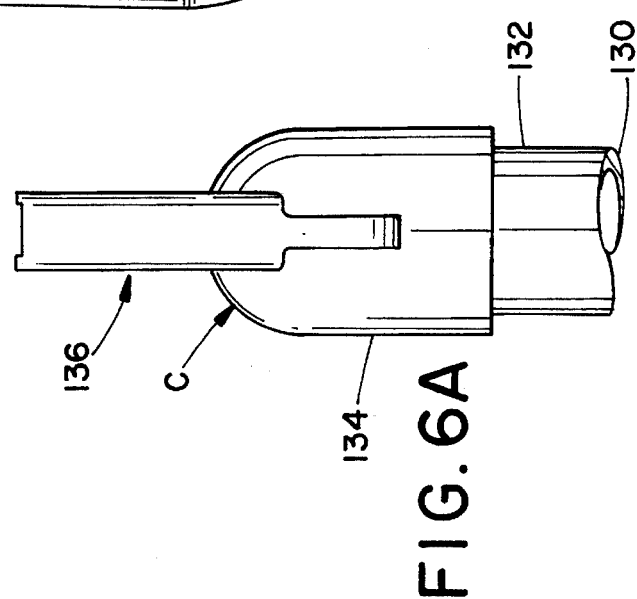

HINGED CEILING CLIP

BACKGROUND OF THE INVENTION

This invention relates primarily to sign displays in stores or the like. More particularly, the present invention relates to quick connect-disconnect attachments for securing displays of this type to a ceiling.

The present invention is especially suited for use in a position suspended from the base of an overhead horizontally extending structure, such as an inverted T-shaped beam of a suspended ceiling, a pipe or an I-Beam. It should, however, be appreciated that the subject invention is capable of broader applications and could be employed with a wide variety of toggling clips useful in numerous environments.

It is a common practice in constructing buildings which are designed primarily for office or retail environments to employ suspended ceilings to shield pipes, conduits, duct work, and other mechanical building services which are normally run exposed beneath the structural ceiling slab of such buildings. Inasmuch as it is quite often necessary to reach the mechanical building systems for maintenance, repair, or alterations after the building is in use, most types of suspended ceilings presently being utilized employ removable ceiling panels so that the mechanical services which are shielded by the suspended ceiling construction can be easily accessed. Such presently available ceiling systems usually include a gridwork to support the panels. The gridwork usually comprises elongate light metal T-bars arranged in rows which are spaced approximately two feet apart. The T-bars are usually suspended from the structural ceiling by means of wire or other fasteners and are hung with the T-head positioned downwardly to act as a flange to receive and retain the ceiling panels therein. The panels are removably suspended between adjacent rows of T-bars and simply rest on the flanged T-heads in a readily installable and removable manner, leaving the T-heads of the elongate grids exposed at the junctions between the adjacent ceiling panels.

It has now become a common practice to mount placards or signs such as advertising displays in stores by supporting them directly on the T-bars of the ceiling grid by a fastening means. However, the known fastening means were usually of a semi-permanent nature such that, e.g., clips for securing the advertising banners would be left mounted to the ceiling grid T-bars permanently by adhesive or screws. The known clips of this type would cause damage to the ceiling grid. Therefore, when the clips were removed, the ceiling grid structure had to be patched or restored to avoid unsightliness.

Even those conventional clips or hangers which are not permanently secured to the ceiling grid have disadvantages. More particularly, the known clips of this type have had a complex construction which renders them expensive to manufacture and difficult to install, or they utilize portions of the clip member which must be bent to secure them in place. In addition, the known clips and hangers have not always provided a reliable connection to the support grid.

Accordingly, it has been considered desirable to develop a new and improved hinged ceiling clip construction which would overcome the foregoing difficulties and others while providing better and more advantageous overall results.

BRIEF SUMMARY OF THE INVENTION

In accordance with the present invention, a clip member is provided.

More particularly in accordance with this aspect of the invention, the clip member comprises a first arm having first and second ends and a second arm having first and second ends. The first and second arms are pivotally connected to each other at a first hinge located intermediate the second end of the first arm and the first end of the second arm. A resilient biasing means is hingedly connected at a first end, by a second hinge, to the first arm and at a second end, by a third hinge, to the second arm. The resilient biasing means maintains the first and second arms in one of two stable end positions of the clip. The first end of the first arm of the clip is spaced further from the second end of the second arm of the clip in an open position of the clip than in a closed position of the clip. The first arm first end is spaced from the second arm second end in any position of the clip.

According to another aspect of the invention, a hanger clip construction for use with overhead members located adjacent a ceiling is provided.

More particularly in accordance with this aspect of the invention, the hanger clip construction comprises a first arm having first and second ends and a second arm having first and second ends. A first hinge connects the first arm second end to the second arm first end. A spring is provided which includes first and second ends. A second hinge connects the spring first end to the first arm and a third hinge connects the spring second end to the second arm. The spring maintains the first and second arms in one of two stable end positions of the hanger clip. The spring is in tension only when the first and second arms are between the two stable end positions. In one of the stable end positions, the first arm first end and the second arm second end extend over side edges of the overhead member to secure the hanger clip thereto.

In accordance with still another aspect of the invention, a fixture adapted for installation in position to be suspended from a base of an overhead member, such as an inverted T-shaped beam of a suspended ceiling is provided.

More particularly in accordance with this aspect of the invention, the fixture comprises a first arm having first and second ends and a second arm having first and second ends. The first and second arms are pivotally connected to each other at a first hinge located intermediate the second end of the first arm and the first end of the second arm. A spring means is hingedly connected at a first end by a second hinge to the first arm and at a second end, by a third hinge to the second arm. The spring means maintains the first and second arms in one of two stable end positions of the fixture. A holding means is provided for supporting an associated object, the holding means is secured to the spring means by a fourth hinge at a first end of the holding means and by a fifth hinge at a second end of the holding means.

One advantage of the present invention is the provision of a new and improved hinged clip that can be selectively secured to an object. The object can, if desired, be an overhead member.

Another advantage of the present invention is the provision of a ceiling clip which is readily attachable to and detachable from an overhead member, such as a pipe, an I-beam or a T-beam of a ceiling grid, without damaging the overhead member.

Still another advantage of the present invention is the provision of a ceiling clip which includes hinged first and second arms and a resilient biasing means which is hingedly connected to the first and second arms.

Yet another advantage of the present invention is the provision of a hinged ceiling clip which is provided with a spring means which biases the ceiling clip into one of two stable end positions. The spring means is in tension only when the ceiling clip is between its two stable end positions.

A further advantage of the present invention is the provision of a ceiling clip which also includes a holding means for supporting an associated object.

A still further advantage of the present invention is the provision of a ceiling clip which is made of one piece and preferably comprises a thermoplastic material so that the clip is inexpensive and can be easily manufactured.

A yet further advantage of the present invention is the provision of a ceiling clip which includes at least three (3), and preferably five (5), film hinges which enable the clip to be reconfigured from a first end position to a second end position and vice versa.

An additional advantage of the present invention is the provision of a ceiling clip installation pole which holds the ceiling clip and enables it to be installed onto an overhead member without the use of a ladder. The installation pole also enables a ceiling clip which is attached in place to be removed from the overhead member.

A yet still further advantage of the present invention is the provision of a method of installation and removal of the ceiling clip from an overhead member which does not damage the overhead member and involves only a longitudinal motion of the clip to attach the clip to the member and a twisting motion of the clip to detach the clip from the member.

Still other benefits and advantages of the invention will become apparent to those skilled in the art upon a reading and understanding of the following detailed specification.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof and wherein:

FIG. 4 is an enlarged front elevational view of the clip of FIG. 1 with a cord and a banner being secured thereto;

FIG. 5 is an enlarged perspective view of the clip of FIG. 1;

FIG. 6A is a side elevational view of a first end of an installation pole adapted for use with the ceiling clip of FIG. 5;

FIG. 6B is a top plan view of the installation pole of FIG. 6A;

FIG. 7 is a front elevational view of the ceiling clip of FIG. 1 in the process of being secured to the ceiling of FIG. 1;

FIG. 8 is a front elevational view, partially in cross-section, of the ceiling clip of FIG. 1 in the process of being removed from its installed position on the ceiling of FIG. 1;

DETAILED DESCRIPTION OF THE PREFERRED EMBODIMENT

Referring now to the FIGURES, wherein the drawings are for purposes of illustrating the preferred embodiment of the invention and not for limiting the same, FIG. 5 shows a hinged ceiling clip A according to the preferred embodiment of the present invention. While the clip is disclosed as being adapted for use to secure a banner or the like to an overhead member such as a ceiling grid structure, it should be appreciated that the clip construction can be utilized for a variety of other purposes as well, such as securing an object, fastened to the clip, to another member. In this connection, it should be recognized that the member to which the clip is fastened does not need to be an overhead member adjacent a ceiling. Rather, the clip can be secured to objects located on the base or walls of a structure, or clipped around a section of a vehicle or the like.

Figure 1:
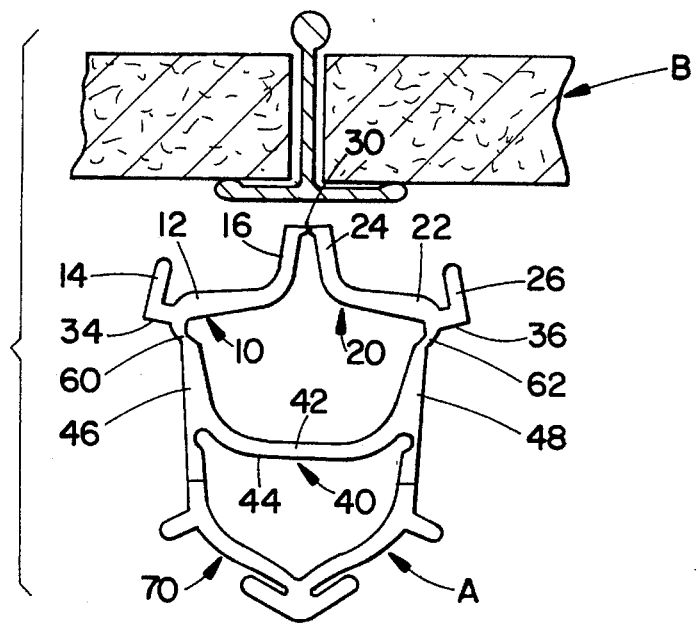
FIG. 1 is a front elevational exploded view, partially in cross-section, of a ceiling clip according to the preferred embodiment of the present invention together with a portion of an associated ceiling illustrating a T-bar grid and two adjacent ceiling tiles that are supported by the T-bar.

With reference now to FIG. 1, the clip A includes a first arm 10 having a thickened central portion 12, a first end 14, and a second end 16. It is evident that the central portion 12 is substantially planar and that the first and second ends 14 and 16 jut away from the plane of the central portion 12 at an angle. In this regard, the first end 14 is an at acute angle in relation to the central portion 12, whereas the second end 16 is at an obtuse angle thereto. The clip further comprises a second arm 20 having a central portion 22, and first and second ends 24 and 26. In essence, the second arm is the mirror image of the first arm. Located between the second end 16 of the first arm 10 and the first end 24 of the second arm 20 is a first hinge 30. The hinge 30 is a film hinge which is of one piece with the first and second arms. As mentioned, the first and second arm central portions 12 and 22 are substantially planar. Each of these arms has an outer side 34 and 36, respectively.

Secured to the outer sides 34 and 36 of the first and second arms 10 and 20 is a resilient biasing means, preferably a spring means 40. The spring means comprises a U-shaped member 42 having a central section 44 and first and second arms 46 and 48. A second hinge 60 is located at the end of the spring means first arm 46 so as to connect it to the outer side 34 of the first arm central section 12. Similarly, a third hinge 62 is located at the end of the second arm 48 of the spring means in order to secure it to the outer side 36 of the second arm central section 22.

Figure 3:
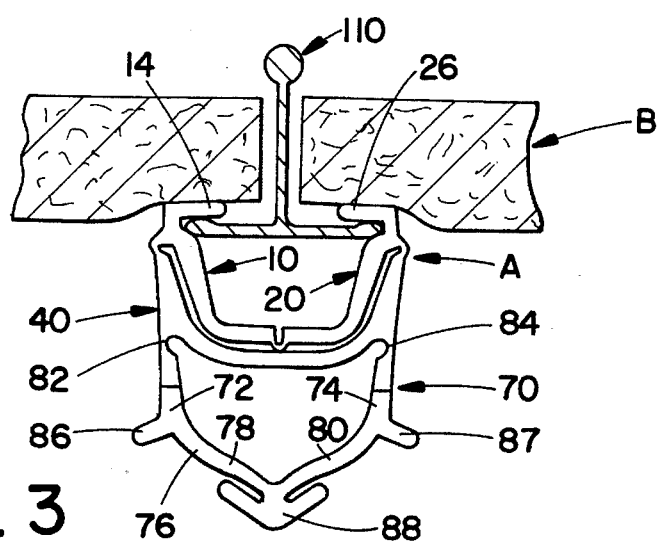
FIG. 3 is a front elevational view of the clip of FIG. 1 secured to the ceiling of FIG. 1.

Mounted on the spring means 40 is a hanger means 70. With reference now also to FIG. 3, the hanger means comprises a first leg 72 and a second leg 74 which are connected to each other by a somewhat V-shaped central section 76. The central section comprises first and second legs 78 and 80. A fourth hinge 82 is located at the end of the first leg 72 to secure the first leg to the spring means 40 at the first arm 46 thereof. Similarly, a fifth hinge 84 is located at the end of the second leg 74 so as to secure that leg to the second arm 48.

Figure 2:
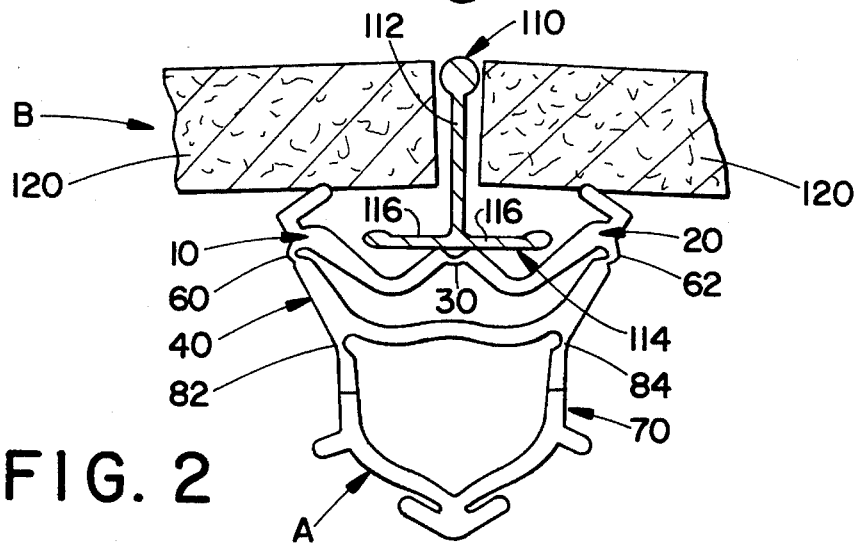
FIG. 2 is a front elevational view of the clip of FIG. 1 in the process of being secured to the ceiling of FIG. 1.

Therefore, there are five hinges used in this construction, namely, hinges 30, 60, 62, 82 and 84. The five hinges, as best seen in FIG. 2, enable the clip A to smoothly move from a first end position, where it is detached from the ceiling grid, as is illustrated in FIG. 1 to a second end position, where it is secured to the ceiling grid, as is illustrated in FIG. 3. The spring 40 is in tension only when it is between its two stable end positions. Thus, the spring is in tension in the position illustrated in FIG. 2.

Located on an outboard side of the first leg 78 is a first projection 86. Similarly, located on an outboard side of the second leg 80 is a second projection 87. Secured to the central section 76 of the hanger means 70 is an arrowhead-shaped projection 88.

With reference now to FIG. 4, the clip A is meant to hold a suitable merchandising display or the like to the ceiling of the store. To this end, a cord 90 can be wound around the hanger means 70. The cord is prevented from slipping off the hanger means by the projections 86 and 87 provided on the legs 78 and 80 of the hanger means. The cord can have an end 92 which is wrapped around the arrowhead-shaped projection 88 to prevent slippage of the cord. The end 92 of the cord can terminate in a barb 94 which can be slipped through a suitable aperture 96 of a ceiling banner 98 or a similar type of sign or display.

It can be seen from FIG. 5 that a first portion of the first and second legs 72, 74 of the hanger means 70, namely the portion adjacent the hinges 82 and 84 is considerably thicker than a second portion of these legs which is adjacent the first and second projections 86, 87. The thinner leg portions accommodate the several loops of cord 90. This construction also reduces the amount of material which is necessary for the manufacture of the clip A. The thicker leg portions are necessary in order to ensure that hinges 82 and 84 are sufficiently strong so that the hanger means 70 does not break away from the remainder of the clip.

With reference now again to FIG. 2, the ceiling B can comprise a grid structure including a plurality of T-bars 110. Each T-bar includes a stem portion 112, and a cross portion 114. It is evident that the cross portion is oriented downwardly towards a floor of the room in which the ceiling is located. In other words, the cross portion 114 is exposed. The cross portion 114 has an inner surface 116 upon which rests a pair of adjacent ceiling panels 120.

In order to install the hinged ceiling clip A, the clip will be brought adjacent the ceiling B as shown in FIG. 1. Thereafter, as shown in FIG. 2, an upward force is exerted against the clip A such that the first hinge 30 contacts the T-bar 110. Thereupon the first and second arms 10 and 20 are caused to rotate around the hinge 30 so as to no longer be coplanar with each other. This is evident from FIG. 2. At the same time, of course, the second and third hinges 60 and 62 and the fourth and fifth hinges 82 and 84 are in use as the spring means 40 flexes and the hanger means 70 also flexes somewhat.

As the first and second arms 10 and 20 of the clip continue to pivot in relation to the ceiling grid T-bar 110, the clip A eventually assumes the position shown in FIG. 3. In this position, the first arm first end 14 and the second arm second end 26 overlie the inner surface 116 of the cross portion 114 in order to hold the clip in position on the T-bar 110. It is evident from FIG. 3 that the two side edges of the T-bar cross portion 114 are tightly held between the respective free ends 14 and 26 of the two arms 10 and 20 and the main portions 12 and 22 of these arms as the arms are thickened toward the two free ends.

The first end 14 of the first arm 10 and the second end 26 of the second arm 20 are spaced from each other in all positions of the clip A as can be seen in FIGS. 1–3. This spacing is necessary as shown in FIG. 3 in order to accommodate the stem portion 112 of the ceiling grid T-bar 110. The spacing is also necessary in order to enable the clip A to be readily detached from the ceiling grid when that becomes necessary. Once the clip A has assumed the position illustrated in FIG. 3, a suitable cord, such as the cord 90 illustrated in FIG. 4 can be wound around the hanger means 70 so as to suspend a banner, such as the ceiling banner 98 illustrated in FIG. 4, from the clip A. Alternatively, the cord 90 can be pre-wound onto the ceiling clip. If that is done, only the banner need to be attached to the free end 92 of the cord once the clip is secured in place on the ceiling grid.

As shown in FIG. 5, the hanger means 70 is substantially planar and extends from the approximate mid-plane of the clip A with the arrowhead-shaped projection 88 being in the same plane as the first and second legs 72, 74 and central section 76 of the hanger means 70. It should be appreciated, however, that other arrangements and constructions of the hanger means 70 can also be utilized as may be desired.

Advantageously, the clip A, including the first and second arms 10 and 20, the spring means 40, and the hanger means 70 is of one piece. It is also preferable that the clip A be manufactured from a suitable resilient material to allow it to snap from its first end position, as illustrated in FIG. 1 to its second end position, as illustrated in FIG. 3 without breaking. The material can be, for example, a suitable thermoplastic such as, e.g. polypropylene. Use of a suitable plastic material for the clip enables the clip to be repeatedly snapped to its open and closed positions without breaking. The clip can be injection molded if desired.

With reference now to FIG. 6A, an installation pole C which can be utilized to mount and dismount the clip A from the ceiling structure B is there illustrated. The installation pole C can comprise a tubular elongated body 130 which can be telescopic as is well known in the art. The tube can be made from a suitable aluminum or, perhaps, even cardboard. Provided on a first end 132 of the tube is a cap 134 which seals that end of the tube. The cap 134 can include an outwardly extending projection 136 which can be substantially rectangular as is evident from FIG. 6B. As shown in FIG. 6B, the projection includes a central recess 138 which is so sized as to accept the ceiling clip A, including the outwardly projecting arms 86 and 87 on the two sides of the hanger means 70. Thus the projection 136 comprises, in top view, four walls including two spaced curved end walls 140 and 142 and two spaced straight side walls 144 and 146. Provided in the two side walls are respective slots 148 and shoulders 150.

With reference now also to FIG. 7, the use of the installation pole C is there illustrated. The clip A can be placed in the recess 138 of the projection 136. The shoulders 150, adjacent to recess 148, accommodate the projections 86, 87 of the clip A. When the clip is suitably positioned, the two arms 10 and 20 of the clip, as well as the spring means 40 extend out of the recess. If desired, as mentioned, the string 90 of FIG. 4 can be secured to the hanger means 70 which is not visible in FIG. 7. When this is done, the string 90 can extend out of the recess at the slot 148. An upward force can be exerted by the installation pole C against the clip such that the first hinge 30 contacts the T-bar 110 so that the clip A can be maneuvered from its first end position as illustrated in FIG. 1 through an intermediate position as illustrated in FIG. 2 to its second end position as illustrated in FIG. 3.

In order to detach the clip A from the ceiling grid T-bar 110, one need merely pull the arms 10 and 20 away from each other adjacent the first arm first end 14 and the second arm second end 26. When this occurs, the first hinge 30 will begin to move upwardly, i.e. away from its position illustrated in FIG. 3 and towards its position illustrated in FIG. 1. Simultaneously therewith, the second and third hinges 60 and 62 and fourth and fifth hinges 82 and 84 will also come in motion as the spring means 40 is flexed away from its stable end position. The clip A will then assume the position illustrated in FIG. 2. As further force is brought to bear on the arms 10 and 20 adjacent the first arm first end 14 and second arm second end 26, the clip will eventually assume the position illustrated in FIG. 1. At this point, the clip falls away from the ceiling grid and can be readily removed. The clip A will cause no damage to the ceiling grid T-bar 110 since it merely snaps on and off the T-bar.

With reference now to FIG. 8, the installation pole C can also be utilized to detach the clip A from its fastened position on the ceiling B. To this end, the clip can be twisted either clockwise or counterclockwise until the clip snaps open. As the installation pole is rotated, a torque is exerted on the clip. This torque will act on the five hinges 30, 60, 62, 82 and 84 to open the first and second arms 10 and 20 and detach the clip A from the ceiling T-grid 110. Thereafter, the installation pole, and the clip A can be lowered away from the ceiling B.

As mentioned previously, the clip A can be utilized with members other than the ceiling T-grid 110 illustrated in FIGS. 1–3. To this end, and with reference now to FIG. 9, the clip A is there illustrated as being secured to a pipe 170. The pipe can be, e.g. an overhead electrical wire conduit, a fluid conducting pipe, or any other suitable type of conduit, whether located on the floor or wall of a structure or vehicle or the like. The ends 14, 16 of the two arms 10, 20 extend over a portion of the pipe 170 such that the distance between the adjacent edges of the ends 14, 16 is less than the diameter of the pipe 170. In this way, the clip A is secured around the pipe 170. Naturally, with different diameter pipes 170, different size clips A will be necessary. If the pipe 170 is an overhead member, the cord 90 can be hung downwardly from the clip A, such that the end of the cord is secured around the arrowhead-shaped projection 88.

Figure 10:
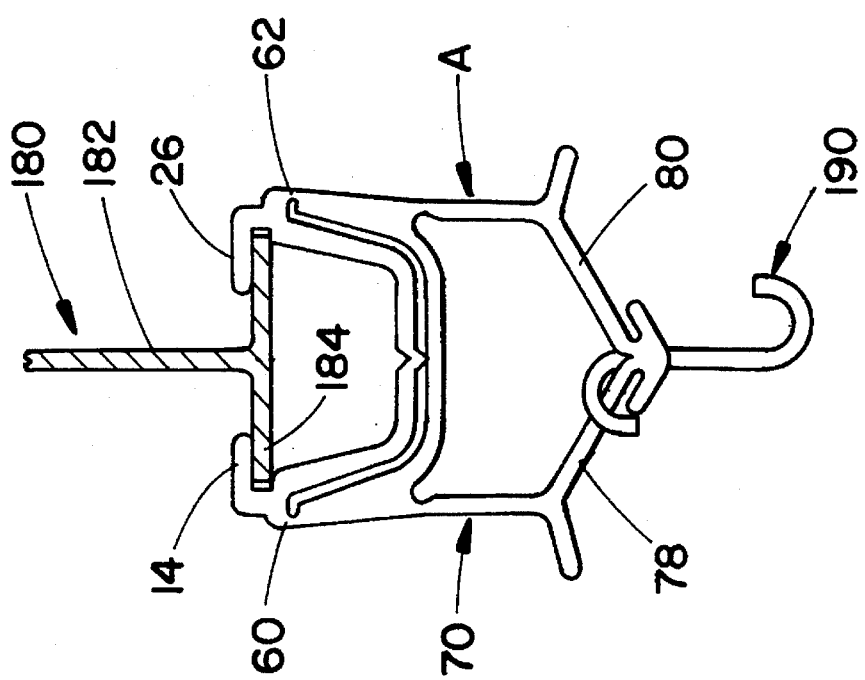

With reference now to FIG. 10, it should be appreciated that the clip A can also be secured to a building structural member, such as an I-beam 180. The I-beam can, if desired, be an overhead member, and is provided with a stem 182 and a cross portion 184. The clip A has its two ends 14, 16 secured over the side edges of the cross portion 184 when the clip is secured to the I-beam 180.

Figure 9:
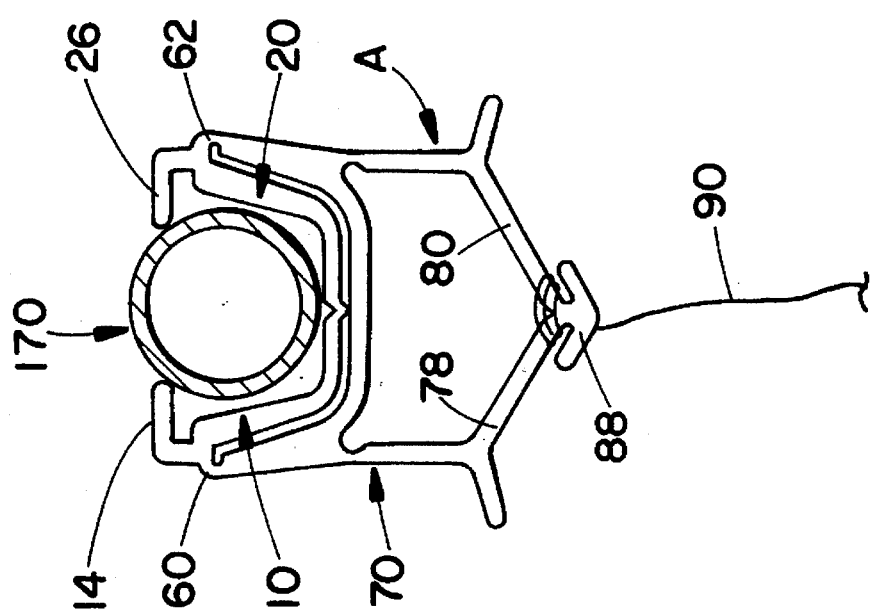
FIG. 9 is a front elevational view, partially in cross-section, of the ceiling clip of FIG. 1 secured to a pipe; and, FIG. 10 is a front elevational view, partially in cross-section, of the ceiling clip of FIG. 1 secured to an I-beam.

It should also be recognized that many other types of securing means can be fastened to the clip A other than the cord 90 illustrated in FIG. 9. To this end, FIG. 10 illustrates the use of an S-shaped hook 190, which is merely hooked into the clip A. More particularly, one end of the S-shaped hook 190 extends over one of the legs, in this case leg 78, of the hanger means 70 of the clip. Many other types of conventional securing means can also be fastened to the hanger means 70, since a large opening is formed in the clip A by the legs 72, 74, 78, 80 of the hanger means portion 70.

The invention has been described in connection with a preferred embodiment of a clip and several environments of its use. However, alterations and modifications will occur to those of average skill in the art upon a reading and understanding of this specification. It is intended to include all such modifications and alterations which come within the scope of the appended claims or the equivalents thereof.

Having thus described the preferred embodiment, the invention is now claimed to be:

1. A clip member comprising:

a first arm having first and second ends;

a second arm having first and second ends, said first and second arms being pivotally connected to each other at a first hinge located intermediate said second end of said first arm and said first end of said second arm;

a resilient biasing means hingedly connected at a first end, by a second hinge, to said first arm and at a second end, by a third hinge, to said second arm, said resilient biasing means maintaining said first and second arms in one of two stable end positions of the clip; and, a holding means for supporting an associated object, wherein said holding means comprises a U-shaped member including a fourth hinge securing a first end of said U-shaped member to said biasing means and a fifth hinge securing a second end of said U-shaped member to said biasing means.

2. The clip member of claim 1 wherein said first and second arms, biasing means and holding means are of one piece.

3. The clip member of claim 1 wherein said spring means comprises a U-shaped member.

4. A hanger clip construction for use with an overhead member, the hanger clip comprising:

a first arm having first and second ends;

a second arm having first and second ends;

a first hinge connecting said first arm second end and said second arm first end;

a spring including first and second ends;

a second hinge connecting said spring first end to said first arm; and, a third hinge connecting said spring second end to said second arm wherein said spring maintains said first and second arms in one of two stable end positions of the hanger clip such that said spring is in tension only when said first and second arms are between said two stable end positions, wherein in one of said stable end positions said first arm first end and said second arm second end extend over opposed side edges of the overhead member such that said first end of said first arm and said second end of said second arm lie in the same plane to secure the hanger clip to the overhead member.

5. The hanger clip of claim 4 wherein said spring comprises a U-shaped member.

6. The hanger clip of claim 4 further comprising a holding means for supporting an associated object, said holding means being secured to said spring.

7. The hanger clip of claim 6 wherein said holding means comprises a substantially U-shaped hanger element comprising first and second legs which are secured to said spring.

8. The hanger clip of claim 7 further comprising a hook element depending from said hanger element.

9. The hanger clip of claim 8 wherein said hook element and said hanger element are coplanar.

10. The hanger clip of claim 8 wherein said hook element is arrow-shaped.

11. The hanger clip of claim 7 further comprising:

a fourth hinge which secures a free end of said first leg of said U-shaped hanger element to said spring; and, a fifth hinge which secures a free end of said second leg of said U-shaped hanger element to said spring.

12. A fixture adapted for installation in position to be suspended from an overhead horizontal member, such as an inverted T-shaped beam of a suspended ceiling, said fixture comprising:

a first arm having first and second ends;

a second arm having first and second ends, said first and second arms being pivotally connected to each other at a first hinge located intermediate said second end of said first arm and said first end of said second arm;

a spring means hingedly connected at a first end, by a second hinge, to said first arm and at a second end, by a third hinge, to said second arm, wherein said spring means maintains said first and second arms in one of two stable end positions of the fixture; and, a unitary holding means for supporting an associated object, said holding means being secured to said spring means by a fourth hinge at a first end of said holding means and by a fifth hinge at a second end of said holding means.

13. The fixture of claim 12 wherein said first arm first end is spaced from said second arm second end in any position of said first and second arms.

14. The fixture of claim 12 wherein said first and second arms, spring means and holding means are of one piece.

15. The fixture of claim 14 wherein said first and second arms, spring means and holding means comprise a resilient material.

16. The fixture of claim 12 wherein said holding means comprises a U-shaped hanger element having first and second ends which are secured to said spring means by said fourth and fifth hinges.

17. The fixture of claim 16 wherein said hanger element further comprises:

a first projection located on a first side of said hanger element; and, a second projection located on a second side of said hanger element.

18. The fixture of claim 16 wherein said holding means further comprises an arrow-shaped hook element which is secured to said U-shaped hanger element.

19. A method for securing a hanger clip to an overhead member, comprising the steps of:

providing a hanger clip construction including a first arm having first and second ends, a second arm having first and second ends, a first hinge connecting the first arm second end to the second arm first end, and a spring including a first end hingedly connected to the first arm and a second end hingedly connected to the second arm;

advancing the clip towards the overhead member;

pivoting the first and second arms in relation to each other about the first hinge;

simultaneously flexing the spring about the second end third hinges; and, bringing said first arm first end and second arm second end into the same plane so as to overlie opposed side edges of the overhead member to secure the clip in place.

20. A method for removing a hanger clip which is secured to an overhead member, comprising:

providing a hanger clip construction including a first arm having first and second ends, a second arm having first and second ends, a first hinge connecting the first arm second end to the second arm first end, and a spring including a first end hingedly connected to the first arm and a second end hingedly connected to the second arm;

rotating the hanger clip about a longitudinal axis extending therethrough;

pivoting said first and second arms about said first hinge and said spring about said second and third hinges;

spacing said first arm first end away from said second arm second end; and, removing the hanger clip from the vicinity of the overhead member.

* * * * *